United States Patent
Gullven et al.

(10) Patent No.: US 10,703,406 B2
(45) Date of Patent: Jul. 7, 2020

(54) METHOD AND SYSTEM FOR DETERMINING ROAD PROPERTIES IN A VEHICLE

(71) Applicant: VOLVO CAR CORPORATION, Gothenburg (SE)

(72) Inventors: Henrik Gullven, Molndal (SE); Tony Gustafsson, Askim (SE); Mats Skold, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 187 days.

(21) Appl. No.: 15/726,890

(22) Filed: Oct. 6, 2017

(65) Prior Publication Data
US 2018/0105206 A1   Apr. 19, 2018

(30) Foreign Application Priority Data
Oct. 13, 2016 (EP) .................................. 16193738

(51) Int. Cl.
  *B62D 6/04* (2006.01)
  *B62D 6/02* (2006.01)
  (Continued)

(52) U.S. Cl.
  CPC .............. *B62D 6/04* (2013.01); *B60W 40/06* (2013.01); *B62D 6/02* (2013.01);
  (Continued)

(58) Field of Classification Search
  CPC .......... B62D 6/04; B62D 6/02; B60W 40/06; B60W 2050/002
  (Continued)

(56) References Cited

U.S. PATENT DOCUMENTS 9,108,640 B2    8/2015  Jackson
9,327,760 B2 *  5/2016  Tamaizumi .......... B62D 5/0472
(Continued)

FOREIGN PATENT DOCUMENTS

DE   102015118447 A1   5/2016
DE   102015203062 A1   8/2016
(Continued)

OTHER PUBLICATIONS

Extended European Search Report dated May 22, 2017, Applicant No. 16193738.8-1616, Applicant Volvo Car Corporation, 6 Pages.

*Primary Examiner* — Yazan A Soofi
(74) *Attorney, Agent, or Firm* — Brooks Kushman P.C.

(57) ABSTRACT

A method in a vehicle for determining road properties is described. The method includes: acquiring vehicle acceleration in x, y and z directions; acquiring a rack force; acquiring a wheel speed for each of all four wheels; determining a wheel speed energy based on the wheel speed; determining a wheel slip of all four wheels of the vehicle based on a respective wheel speed of the wheel; determining an acceleration energy in each of the x, y and z-directions based on the vehicle acceleration and the vehicle speed; determining a rack force energy based on the detected rack force; and determining road properties based on the wheel speed energy, rack force energy and vehicle speed. A system is also described for performing the method.

16 Claims, 8 Drawing Sheets

(51) Int. Cl.
*B60W 40/06* (2012.01)
*B60W 50/00* (2006.01)

(52) U.S. Cl.
CPC . *B60W 2050/002* (2013.01); *B60W 2510/202* (2013.01); *B60W 2520/105* (2013.01); *B60W 2520/26* (2013.01); *B60W 2520/28* (2013.01); *B60W 2552/35* (2020.02)

(58) Field of Classification Search
USPC .......................................................... 701/41
See application file for complete search history.

(56) References Cited

U.S. PATENT DOCUMENTS

| | | | |
|---|---|---|---|
| 9,434,388 | B2 | 9/2016 | Huntzicker et al. |
| 9,669,839 | B2 | 6/2017 | Wagner |
| 2007/0029129 | A1* | 2/2007 | Shiozawa ............ B62D 5/0472 180/446 |
| 2008/0243334 | A1* | 10/2008 | Bujak ................ B60G 17/0165 701/37 |
| 2009/0248231 | A1* | 10/2009 | Kamiya ............... G05D 1/0061 701/23 |
| 2010/0228444 | A1* | 9/2010 | Kojo .................... B60T 8/1755 701/42 |
| 2012/0046836 | A1* | 2/2012 | Strecker ............... B62D 5/0472 701/41 |
| 2016/0121902 | A1* | 5/2016 | Huntzicker ......... B60W 40/068 701/41 |
| 2016/0244065 | A1* | 8/2016 | Wagner ................ B60W 40/06 |
| 2016/0347361 | A1* | 12/2016 | Schnug ................... B62D 3/12 |

FOREIGN PATENT DOCUMENTS

| | | |
|---|---|---|
| EP | 0323066 A2 | 7/1989 |
| EP | 0795448 A2 | 9/1997 |

* cited by examiner

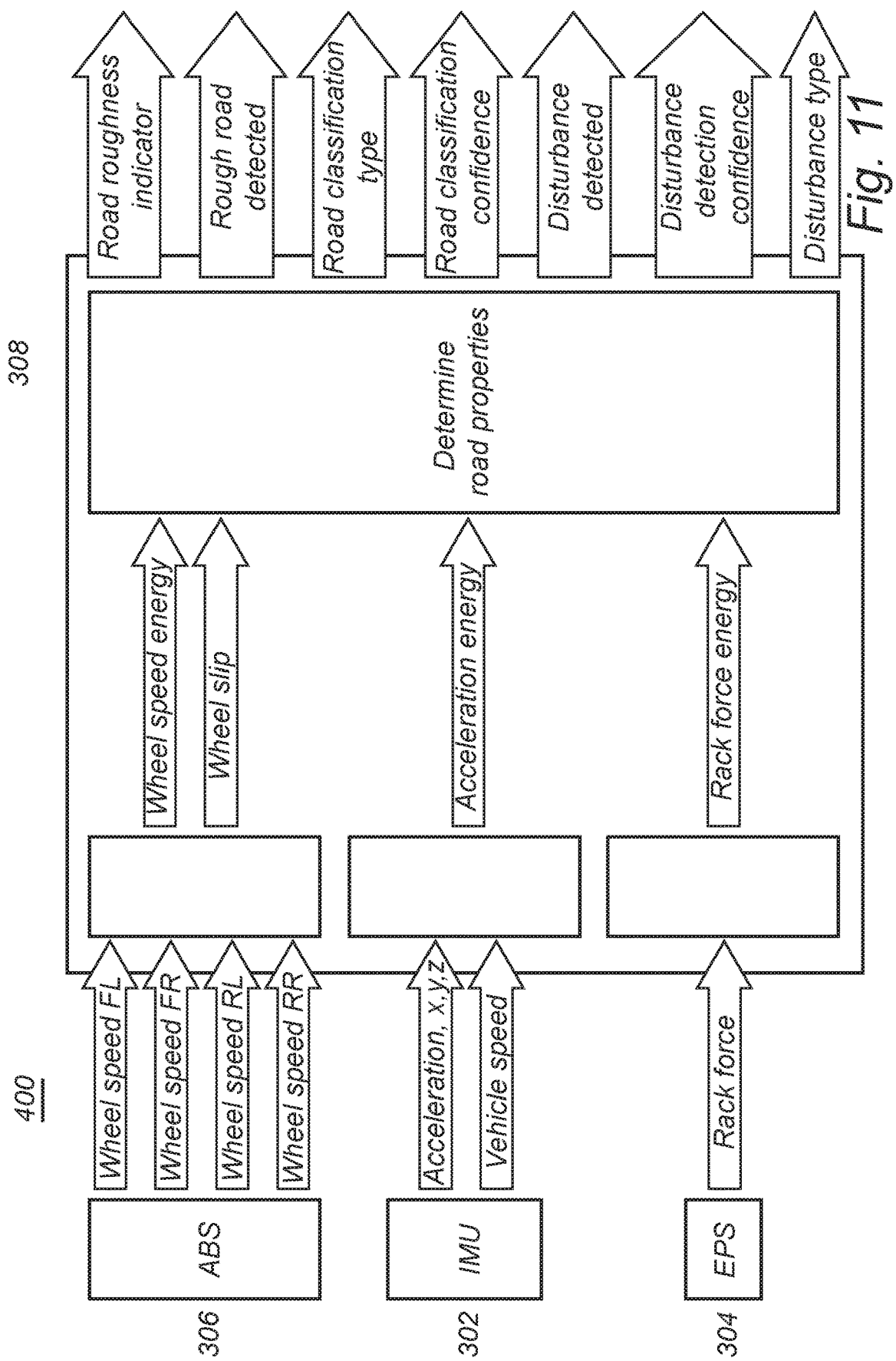

METHOD AND SYSTEM FOR DETERMINING ROAD PROPERTIES IN A VEHICLE

CROSS-REFERENCE TO RELATED APPLICATIONS

This application claims foreign priority benefits under 35 U.S.C. § 119(a)-(d) to European patent application number EP 16193738.8, filed Oct. 13, 2016, which is incorporated by reference in its entirety.

TECHNICAL FIELD

The present disclosure relates to a method and a system in a vehicle for detection and classification of road surface roughness and disturbances.

BACKGROUND

Modern vehicles contain an increasing number of sensors for detecting a range of environmental and vehicle parameters. In particular, vehicles utilizing sensors for self-driving and active safety rely heavily on various sensors of different types to control vehicle behavior.

However, in a vehicle driving over a rough road surface which may comprise pot holes, rough asphalt, unpaved roads, gravel roads, snow, cobblestone, etc., disturbances are introduced in vehicle and sensors. Such disturbances may in turn lead to erroneous readings from the sensors.

By detecting such road surfaces using existing vehicle dynamics sensors together with software and algorithms, vehicle systems can compensate for the disturbances and provide a better functionality. Road roughness information can for example be provided to a vehicle suspension system. Moreover, information regarding road disturbances like frost heaves and pot holes may be of interest by road maintainers, to improve road quality and to avoid accidents.

U.S. Pat. No. 9,108,640 discloses a system where four vertical displacement sensors, one for each wheel, are added to the shocks and thereby used to detect vertical movement of the wheel and in that way, determine and report road quality using a vehicle GPS.

However, an improved system and method for identifying road properties is still desirable.

SUMMARY

In view of above-mentioned and other drawbacks of the prior art, it is an object of the present disclosure to provide an improved method and system in a vehicle for determining road properties.

According to a first embodiment of the disclosure there is provided a method in a vehicle for determining road properties, the method comprising: detecting vehicle acceleration in x, y and z directions; detecting a rack force; detecting a wheel speed for each of all four wheels; determining a wheel speed energy based on the wheel speed; determining a wheel slip of all four wheels based on a respective wheel speed of the wheel; determining an acceleration energy in each of the x, y and z-directions based on the vehicle acceleration and the vehicle speed; determining a rack force energy based on the detected rack force; and determining road properties based on the wheel speed energy, the wheel slip, the acceleration energy, the vehicle speed and the rack force energy.

The present disclosure is based on the realization that an accurate determination of road properties can be achieved using sensors and arrangements already existing in a vehicle by combining information from wheel speed sensors, acceleration sensors and rack force sensors. In particular, using information about the rack force makes it possible to derive more detailed information of road properties as will be discussed in further detail in the following.

A rack force is defined herein as a force acting on a steering rack of a vehicle. The detected or determined rack force can thereby be utilized to derive road surface properties since the rack force provides information about forces acting on the steering wheels of the vehicle.

The respective energies used to determine the road properties are arrived at by integration of time dependent input signals, where the input signals may be either time-continuous or time-discrete. Typically the static energy level is removed. Further details relating to how signal energies are determined based on various input signals are well known in the field of signal processing and will not be discussed in detail herein.

According to one embodiment of the disclosure, determining road properties may further comprise determining the vehicle acceleration in x, y and z directions in an adaptive frequency band. An increased vehicle speed may lead to an increased frequency of the acquired acceleration energies. Thereby, the frequency band for the acceleration can be adapted to the current vehicle speed. In practice, the selection of a frequency band can be seen as a band-pass filter applied to the acceleration signal prior to determining the acceleration energy, i.e., prior to integration. The adaptive frequency band may thus be scaled with speed such that a higher vehicle speed leads to a frequency bad at a higher frequency.

Moreover, a higher vehicle speed may give rise to acceleration energies having a higher amplitude. Therefore, the acceleration energy may be scaled with respect to vehicle speed to facilitate detection of different types of surfaces at different vehicle speeds. It should also be noted that the relation between vehicle speed and acceleration amplitude may be either linear or non-linear, and that a suitable scaling factor or scaling function can be derived empirically or analytically for different vehicle speeds or speed intervals.

According to one embodiment of the disclosure the wheel speed energy may be determined as the individual wheel speed energy in an adaptive frequency band. By determining the wheel speed individually for each wheel, it is possible to identify road surface properties which only affect a subset of the four wheels, such as a hole or a bump which may only affect the right or left side wheels According to one embodiment of the disclosure the wheel speed energy may be determined as the total wheel speed energy in an adaptive frequency band. By determining the total wheel speed energy, a more accurate determination can be made for road surface properties influencing all wheels of the vehicle. The total wheel speed energy may be determined as a summation of the individual energies or as an average energy. It may for example be advantageous to determine an average energy to reduce the influence of outliers in the determined energies.

According to one embodiment of the disclosure, the adaptive frequency band may comprise at least two separate sub-bands. By selecting two or more separate frequency bands where the energies are studied it is possible to single out different road surface properties known to exhibit different behavior. The plurality of frequency bands may be overlapping or non-overlapping. Moreover, as discussed earlier, the different selected frequency bands may also in this case be related to the vehicle speed, where a higher vehicle speed may give rise to signals at higher frequencies. The various frequency bands and sub-bands may be predetermined based on empirically established behavior of the vehicle for various known types of road surfaces. It is also possible to modify or adapt the frequency bands based on self-learning algorithms in the vehicle for example to identify new types of road surfaces or to adapt the detection algorithms based on changed properties of the vehicle.

According to one embodiment of the disclosure, determining road properties may further comprise comparing a wheel speed energy with a predetermined threshold value. As a general estimation, the amplitude of the wheel speed energy is proportional to the road roughness. Thereby, a comparison of a wheel speed energy with a predetermined threshold value provides information about the overall road roughness, which in turn may be used to determine the road surface properties in more detail. The wheel speed energy and/or the threshold value may also be scaled with respect to the vehicle speed to more accurately determine road properties for different vehicle speeds.

According to one embodiment of the disclosure, determining road properties may comprise comparing an amplitude of the wheel slip with a predetermined threshold value. The wheel slip energy may be determined individually for each of the four wheels. In a similar manner, as for the wheel speed described above, the amplitude of the wheel slip energy is proportional to the road roughness and road properties can be derived by comparing the wheel slip energy with predetermined amplitude values. Also here, the wheel slip energies may be scaled with respect to the speed of the vehicle.

According to one embodiment of the disclosure, determining road properties may comprise observing the sign of the wheel slip. Oscillations in wheel slip can be identified by observing the sign of the determined wheel slip. If the wheel slip changes sign within a predetermined time frame, this may be an indication of a rough road surface. Moreover, a frequency of a sign change of the wheel slip can be used to further determine road properties.

According to one embodiment of the disclosure, determining road properties may comprise comparing an amplitude of the rack force energy with a predetermined threshold value. Moreover, the method may further comprise determining the road properties based on a sign of the rack force. The rack force energy may be determined in at least one adaptive energy band as described above, and in a similar manner the amplitude and sign of the rack force energy can then be used to determine road properties.

According to one embodiment of the disclosure the rack force may be determined based on an applied torque in a power steering system. In a power steering system, the rack force can be seen as the force required to maintain a desired steering wheel angle. Thereby, the rack force can be derived from the power steering system without a dedicated rack force sensor. However, for the purpose of determining road properties, the rack force may also be determined by a dedicated strain gauge sensor located on the steering rack or a torque sensor on the steering column of the vehicle.

According to one embodiment of the disclosure, the method may further comprise determining a road surface classification by:
  comparing the wheel speed energy with at least one threshold value
  comparing the acceleration energy with at least one threshold value;
  comparing the rack force energy with at least one threshold value; and if at least one of the wheel speed energy, acceleration energy and rack force energy exceeds at least one of the threshold values, determining a road surface classification. Thereby, a range of different road surface classifications can be defined by comparing the determined parameters with the predetermined threshold values. The road surface classification may for example include cobblestone, gravel, snow, pothole, bump, washboard etc. and the different classifications may in turn be divided into more detailed sub-classifications for example by describing the severity of a specific classification.

As discussed previously, the threshold values may be scaled with vehicle speed, and the frequency band at which the energies are studied may also be dependent on vehicle speed. Accordingly, a range of different classifications can be predetermined in terms of combinations of threshold values such that a classification can readily be determined.

According to a second embodiment of the disclosure, there is provided a system for determining road properties in a vehicle, the system comprising: a vehicle acceleration sensor configured to detect an acceleration in x, y and z directions: a rack force determination arrangement; and a wheel speed sensor for each of all four wheels; a determination unit configured to: determine a wheel speed energy based on said wheel speed; determine a wheel slip of all four wheels based on a respective wheel speed of said wheel; determine an acceleration energy in each of said x, y and z-directions based on said vehicle acceleration and said vehicle speed; determine a rack force energy based on the detected rack force; and determine road properties based on wheel speed energy, rack force energy and vehicle speed.

The described system may to a certain degree utilize sensors in the vehicle which are used also for other purposes, such as wheel speed sensors of an anti-lock brake system (ABS). Acceleration energies may be determined using an existing inertial measurement unit (IMU). The determination unit may be embodied by a generic vehicle electronic control unit (ECU) or by a dedicated unit for determining road properties.

According to one embodiment of the disclosure, the system may comprise a power steering system configured to determine a force acting on a steering rack of said vehicle. In the case where the steering angle is kept constant by the driver, the rack force can be derived from the torque required to maintain the steering wheels at the desired steering angle. In similar manner, the rack force can also be derived when the vehicle is turning.

Additional effects and features of the second embodiment of the disclosure are largely analogous to those described above in connection with the first embodiment of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other features of the present disclosure will now be described in more detail, with reference to the attached drawings showing an example embodiment of the disclosure.

FIG. 11 schematically outlines a method and system according to an embodiment of the disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the method and system according to the present disclosure will be described.

Figure 1:
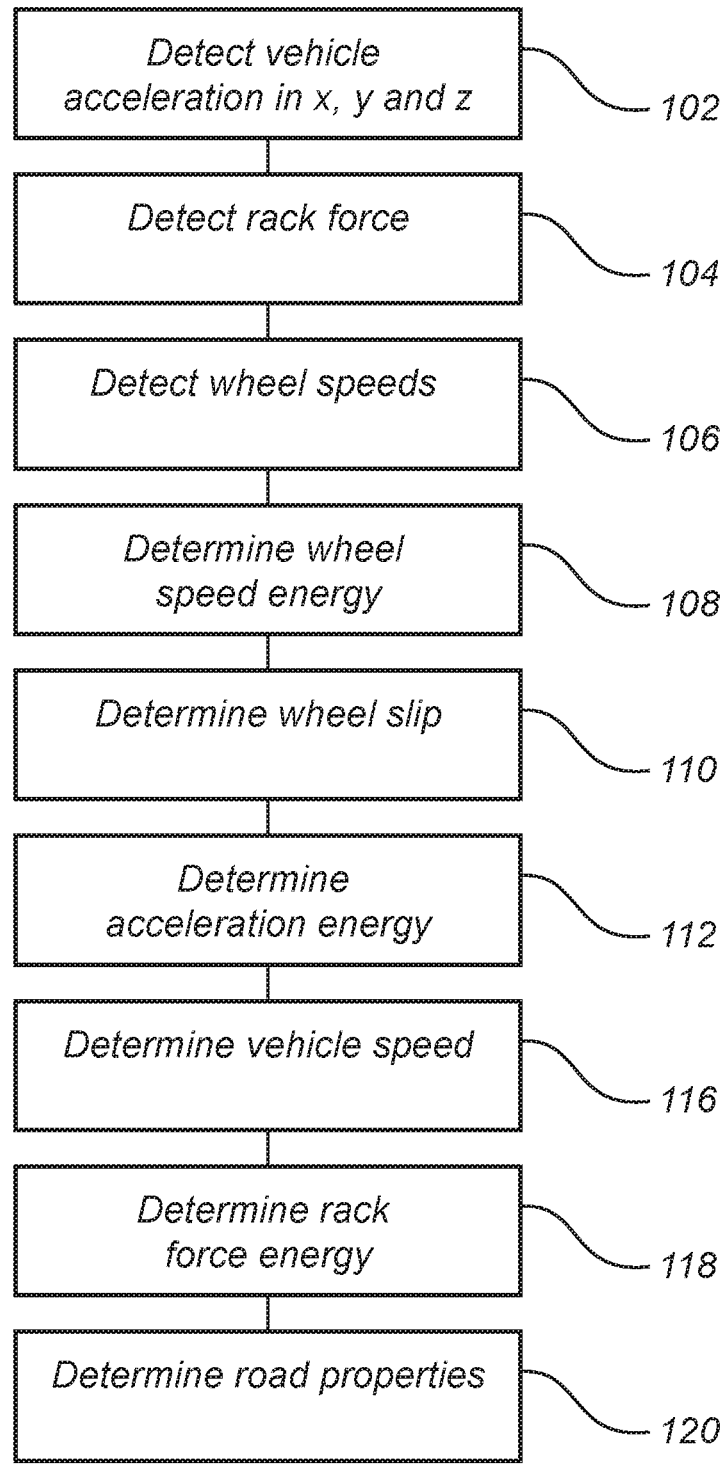
FIG. 1 is a flow chart outlining the general steps of a method according to an embodiment of the disclosure.

The flow chart of FIG. 1 outlines the general steps of a method for determining road properties according to an embodiment of the disclosure.

First, a vehicle acceleration in x, y and z directions is detected 102, a rack force is detected and a wheel speed for each of all four wheels is detected 106. It is assumed that the readily available methods are used for detecting or acquiring the acceleration, rack force and wheel speed.

Next, the wheel speed energy is determined 108 based on the wheel speed, the wheel slip of all four wheels is determined 110 based on a respective wheel speed of the wheel, the acceleration energy in each of the x, y and z-directions is determined 112 based on the vehicle acceleration, the vehicle speed is determined 114, and the rack force energy is determined 116 based on the acquired rack force.

In a final step, the road properties are determined 120 based on the wheel speed energy, the wheel slip, the acceleration energy, the vehicle speed and the rack force energy.

Figure 2:
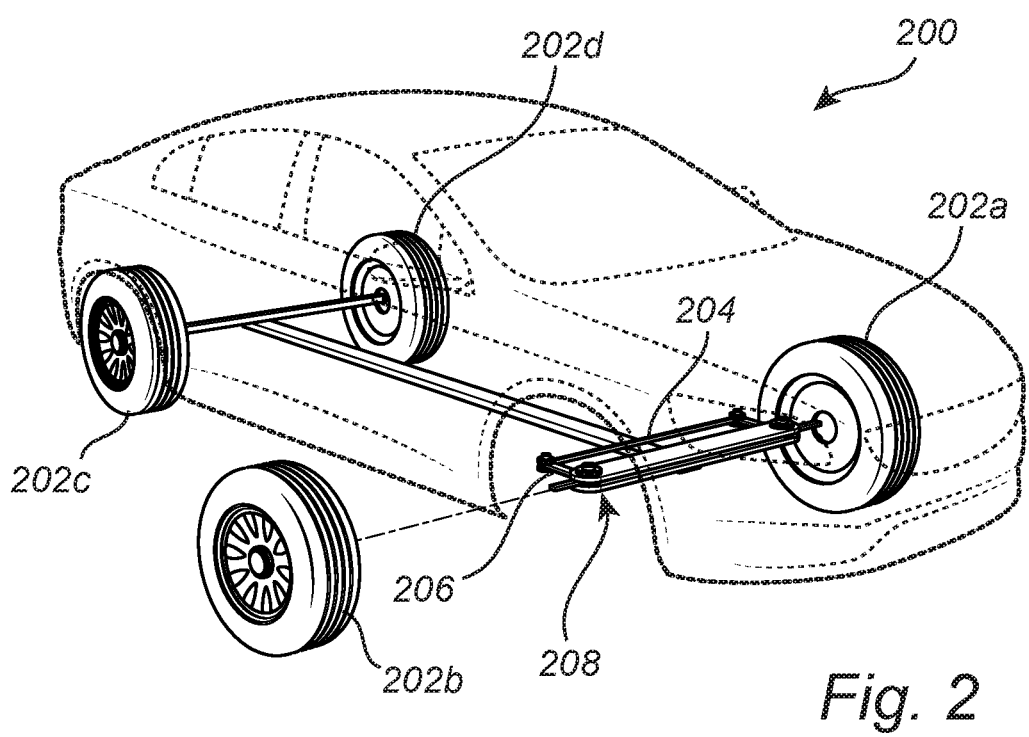
FIG. 2 is a schematic illustration of a vehicle comprising a system according to an embodiment of the disclosure.

FIG. 2a illustrates a vehicle 200 comprising a system 300 according to an embodiment of the disclosure. The vehicle 200 comprises at least one steerable wheel 202a-b. The steerable wheels 202a-b are here shown as the front wheels of the vehicle 200. The vehicle 200 further comprises rear wheels 202c-d. Furthermore, the vehicle 100 comprises an axle rack 204 pivotably attached to a linkage arm 206 which is connected to a steerable wheel 102a-b such that when the axle rack 204 is subjected to a force which causes a translational motion of the axle rack 204, the linkage arm 206 rotates about a kingpin 208 and thereby causes a turning motion of the wheel 202a-b.

The vehicle may be provided with an electronic power steering system (EPS) comprising an electrical motor which applies a turning torque to a steering column (not shown), which in turn is transferred to the axle rack 204. The force acting on the axle rack 204 can thus be seen as the rack force. During operation of the vehicle 200, the desired position of the steering wheels 202a-b is guided by the EPS. If external forces act on the steering wheels 202a-b, for example resulting from driving on a rough road surface, the applied turning torque may have to be changed to compensate for the external force acting on the wheels 202a-b. Thereby, the EPS can provide a measure of the rack force to a road roughness determination unit based on the applied torque.

However, it should be noted that the rack force may also be detected in other ways, for example by using a strain gauge mounted on the axle rack 204 or a torque gauge mounted on the steering column.

Figure 3:
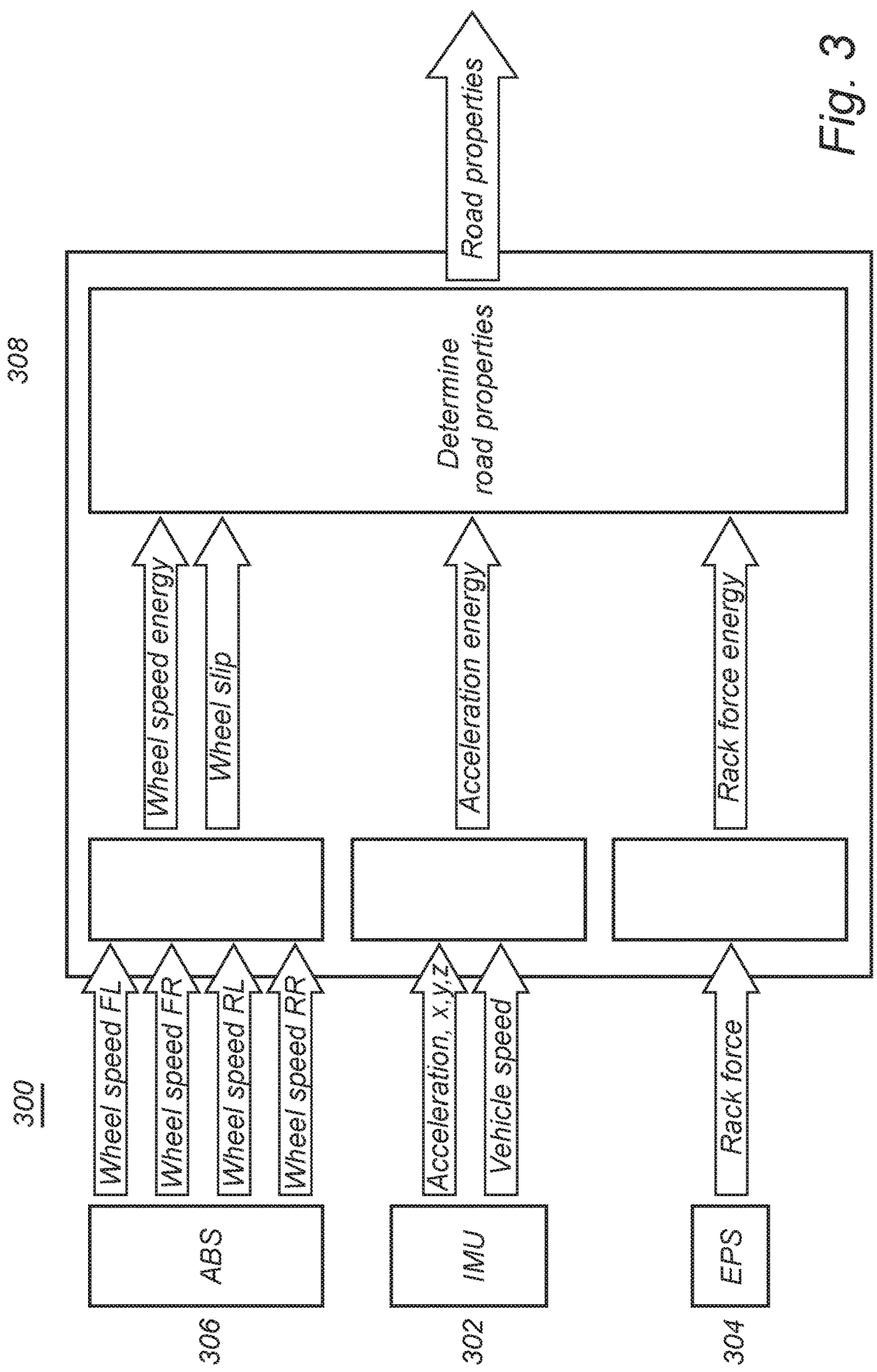
FIG. 3 is a schematic block diagram outlining a system according to an embodiment of the disclosure.

FIG. 3 schematically illustrates a system for determining road properties in a vehicle according to an embodiment of the disclosure. The system comprises a vehicle acceleration sensor 302, here embodied as an inertial measurement unit (IMU), configured to detect vehicle acceleration in x, y and z directions. The system further comprises a rack force determination arrangement in the form of a power steering system 304 and a wheel speed sensor 306 for each of all four wheels. The wheel speed sensors 306 are here illustrated as being part of an anti-lock braking system (ABS). The communication between different sensors and units in the system 300 typically takes place via a CAN-bus of the vehicle.

The vehicle speed is here illustrated as being determined by the IMU. However, the vehicle speed may also be acquired by means of a GPS unit, or from a combination of inputs from the IMU and the GPS.

In a road roughness determination unit 308, the aforementioned parameters are transformed to energies by integrating the measured time-dependent signals. The determination unit 308 is configured to determine a wheel speed energy and a wheel slip for each wheel based on the respective wheel speed, determine an acceleration energy in each of the x, y and z-directions based on the vehicle acceleration and a vehicle speed, and to determine a rack force energy based on the detected rack force. Even though the determination unit 308 is schematically illustrated as a single unit, the determination unit may comprise several specific or dedicated electronic units comprising one or more microprocessors or the like. It should also be noted that the system 300, IMU 302, power steering system 304, ABS 306, determination unit 308, as well as any other unit, module, system, device, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Taking the wheel speed energy, the wheel slip, the acceleration energy, the rack force energy and the vehicle speed as input parameters, the road properties can thereby be determined. Specific road properties can be identified if one or more of the observed input parameters exceed predetermined threshold values.

In the following, the treatment and behavior of the different input parameters will be discussed in further detail and example of different types of road surfaces will be discussed.

Figure 4:
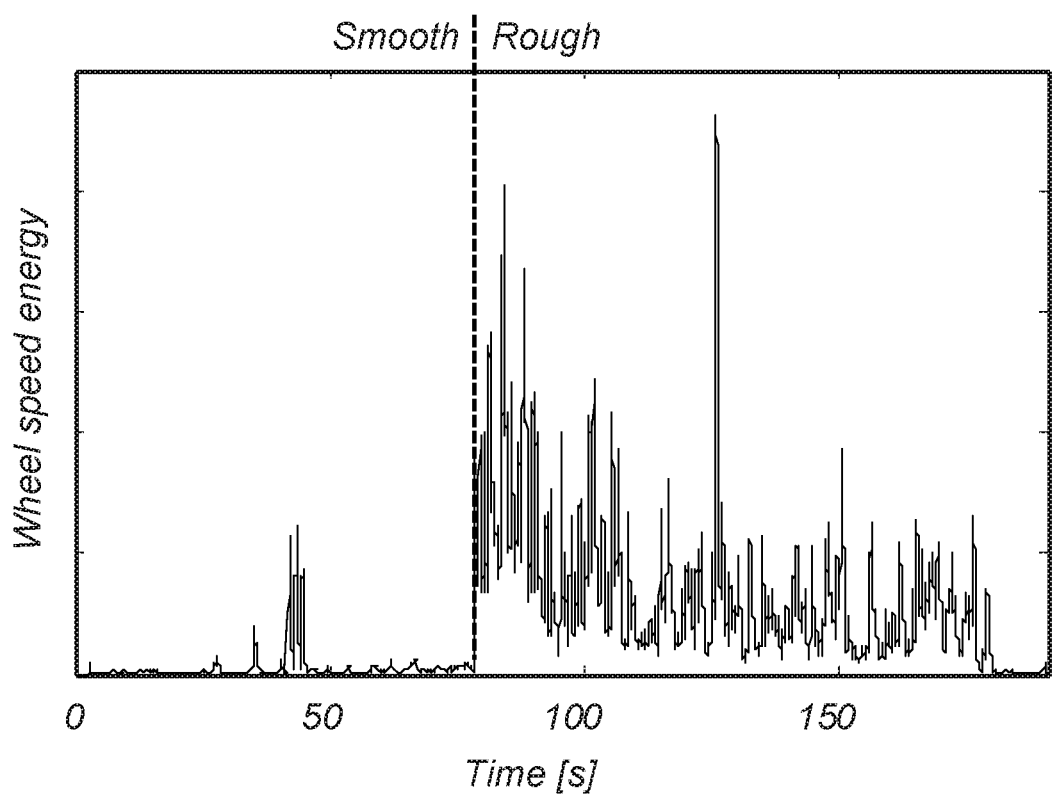
FIG. 4 is a graph outlining an exemplary wheel speed energy of a vehicle according to an embodiment of the disclosure.

FIG. 4 is a graph illustrating the energy derived from the wheel speed signals as a function of time when a vehicle transitions from a smooth road surface to a rough road surface, where the transition is illustrated by the dashed line. The wheel speed signals can be acquired from ABS wheel speed sensors. In the present example, the rough road surface is a cobblestone road and is as such affecting all four wheels of the vehicle. However, even though the graph of FIG. 4 illustrates the total wheel speed energy, it is also possible to observe the individual wheel speed energies to derive road properties. Moreover, the energy is derived in an adaptive frequency band, where the present road disturbances typically can be found at a frequency in the range of 8-16 Hz. The given frequency range can be considered to cover all vehicle velocities. The frequency range is primarily related to the resonance frequency of the vehicle suspension arrangement. Moreover, the energy increases with increasing vehicle velocity, requiring a scaling factor for accurately detecting disturbances at different vehicle velocities.

Figure 5:
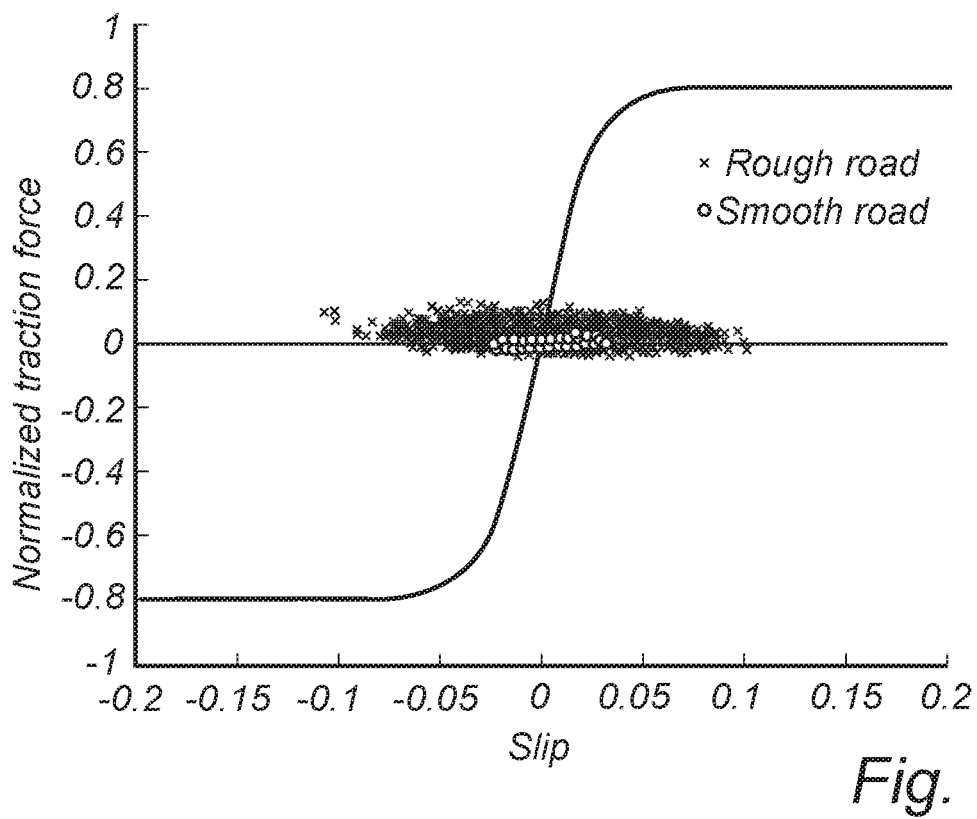
FIG. 5 is a graph outlining an exemplary traction force of a vehicle according to an embodiment of the disclosure.

FIG. 5 schematically illustrates the wheel slip vs normalized traction force for 20 seconds of driving on a rough road surface and a smooth road surface, respectively. The wheel slip is derived from the acquired wheel speeds, and the wheel slip oscillations can be used to determine the roughness of the road surface. In particular, if the wheel slip changes sign during a predetermined time period, or if the wheel slip amplitude exceeds a predetermined threshold value, the road can be considered to be a rough road. In FIG. 5, it can be seen that the amount of wheel slip is greater for a rough road, as would be expected.

Figure 6:
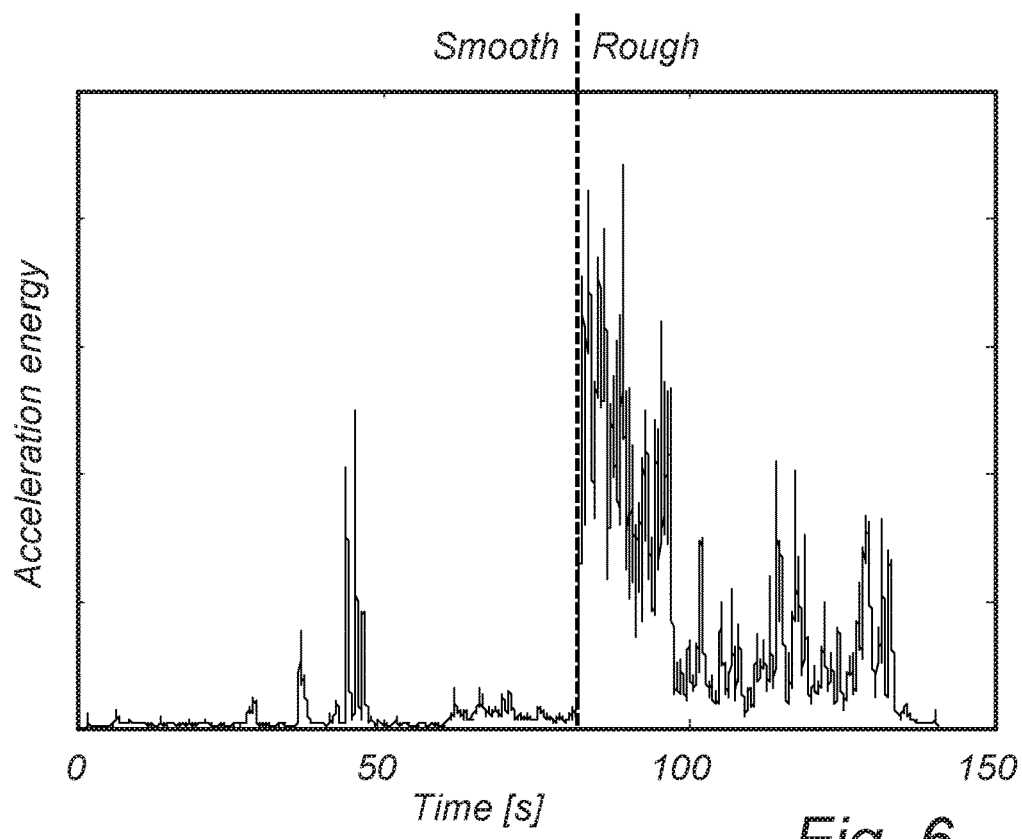
FIG. 6 is a graph outlining an exemplary acceleration energy of a vehicle according to an embodiment of the disclosure.

FIG. 6 schematically illustrates the vehicle acceleration energy as a function of time for a vehicle passing from a smooth road surface to a rough road surface, where the transition from a smooth road to a rough road is illustrated by the dashed line in the graph. The acceleration energy is significantly greater for the rough road than for a smooth road, making the transition easily identifiable. FIG. 6 illustrates the acceleration in the z-direction, Az. However, it is also possible to observe the acceleration in the x and/or the y-direction or as a combination of x, y and z-accelerations.

Figure 7:
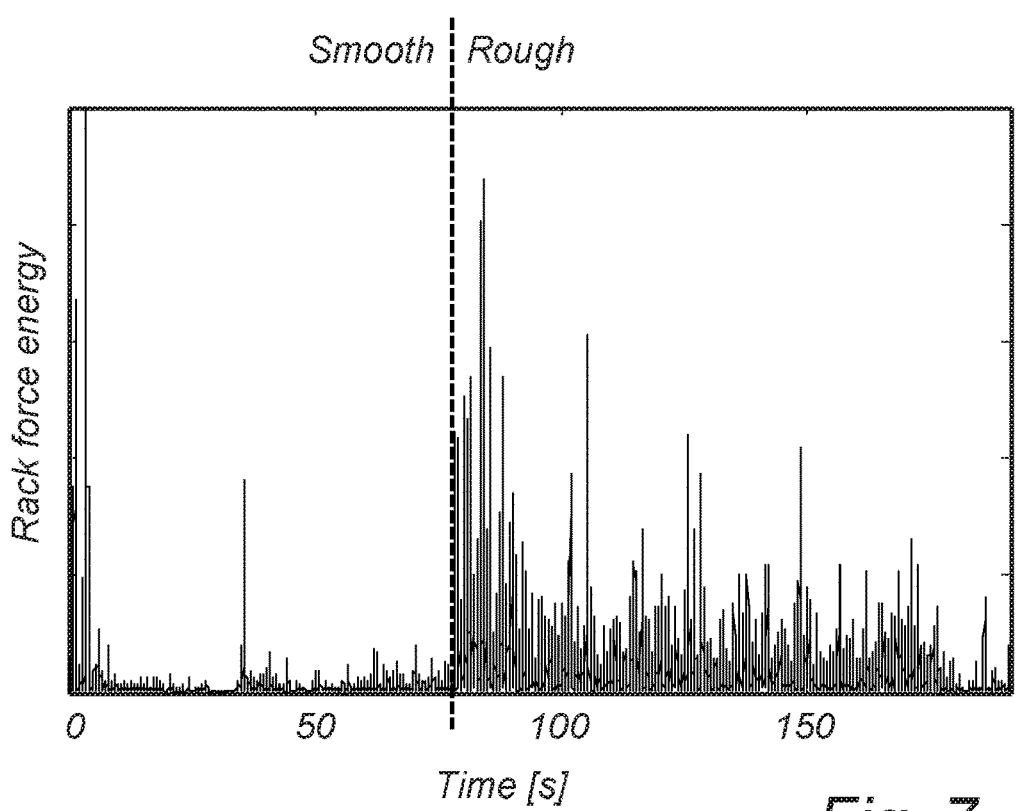
FIG. 7 is a graph outlining an exemplary rack force energy of a vehicle according to an embodiment of the disclosure.

FIG. 7 schematically illustrates the rack force energy as a function of time for a vehicle passing from a smooth road surface to a rough road surface, where the transition from a smooth road to a rough road is illustrated by the dashed line in the graph. Also in this case the energy is significantly greater for the rough road than for a smooth road, making a transition easily identifiable also by observing the rack force energy.

Figure 8:
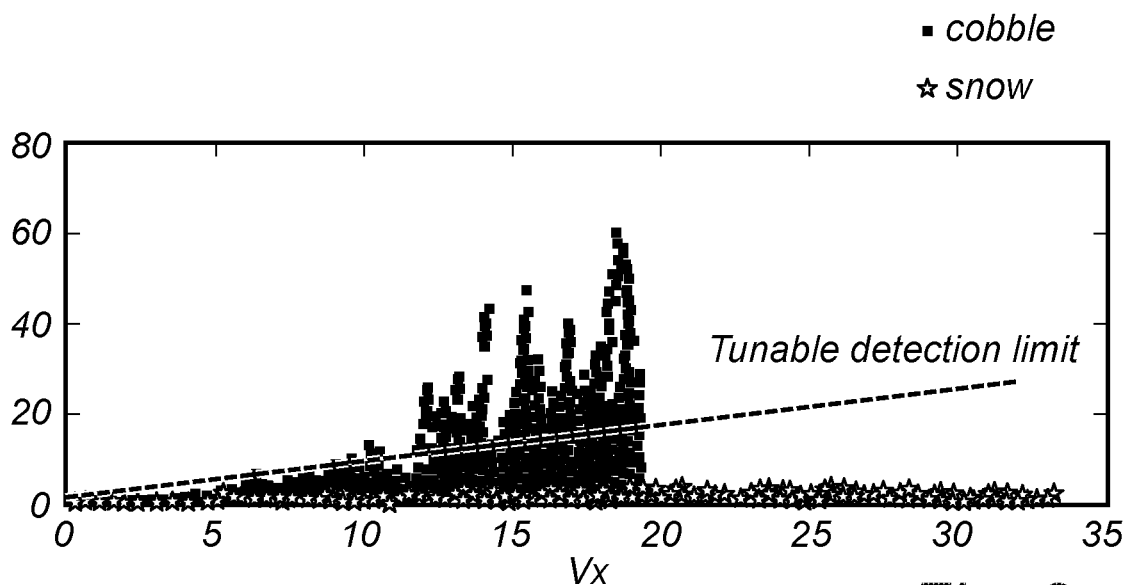
FIG. 8 is a graph outlining an exemplary road surface indication for a vehicle according to an embodiment of the disclosure.

In FIG. 8, the wheel speed energy and rack force energy is combined to provide a measure of the road roughness as a function of vehicle velocity, vx, illustrating the two cases of a cobble road and a snow-covered road. Moreover, a tunable detection limit is illustrated to show the limit for determining if the road surface should be classified as rough or smooth, where the illustrated detection limit is scaled with vehicle velocity.

Moreover, since the frequency of the detected acceleration signal is different for different types of road surfaces and disturbances, several different frequency bands, i.e., band-pass filters, can be used when integrating the acceleration signal. Accordingly, different detection limits can be employed to observe different types of surfaces and disturbances in different frequency intervals. For example, the acceleration signals from a vehicle travelling on a gravel road typically have a higher frequency than the acceleration signals from a vehicle hitting a pot-hole.

FIGS. 4-8 have illustrated different ways to distinguish a rough road surface from a smooth road surface using the inventive system and method. However, it is also desirable to classify the road surface in more detail, for example by detecting the type of rough surface, i.e., gravel, cobblestone, washboard etc.

When observing the above described energies individually, it may in some cases be easy to detect a transition from one road type to another, i.e., from a smooth road to a rough road or vice versa. However, to provide an absolute classification of the road surface, it is advantageous to observe several determined parameters in combination, and also to scale the energies with respect to the speed of the vehicle. Accordingly, a more detailed classification can be reached by combining different determined parameters and by comparing them with different sets of predetermined threshold values corresponding to specific known road surface classifications.

The predetermined sets of threshold values can for example be derived empirically from tests using a specific vehicle type on different surfaces. The threshold values may also be derived or refined using a self-learning algorithm employed when driving a particular vehicle type over a surface having known properties. In a similar manner, the scaling parameters for the vehicle speed and the predetermined frequency bands can also be derived. Moreover, it is not always necessary to study all inputs for accurately determining and classifying the road properties. Accordingly, road properties may be determined and/or classified based on any selected subset of wheel speed energy, wheel slip, acceleration energy, vehicle speed and rack force energy.

In addition to detecting different types of road surfaces described above, it is also desirable to detect an isolated disturbance such as a hole or a bump. Commonly occurring road disturbances which are desirable to detect include pot-holes and frost heaves.

Figure 9:
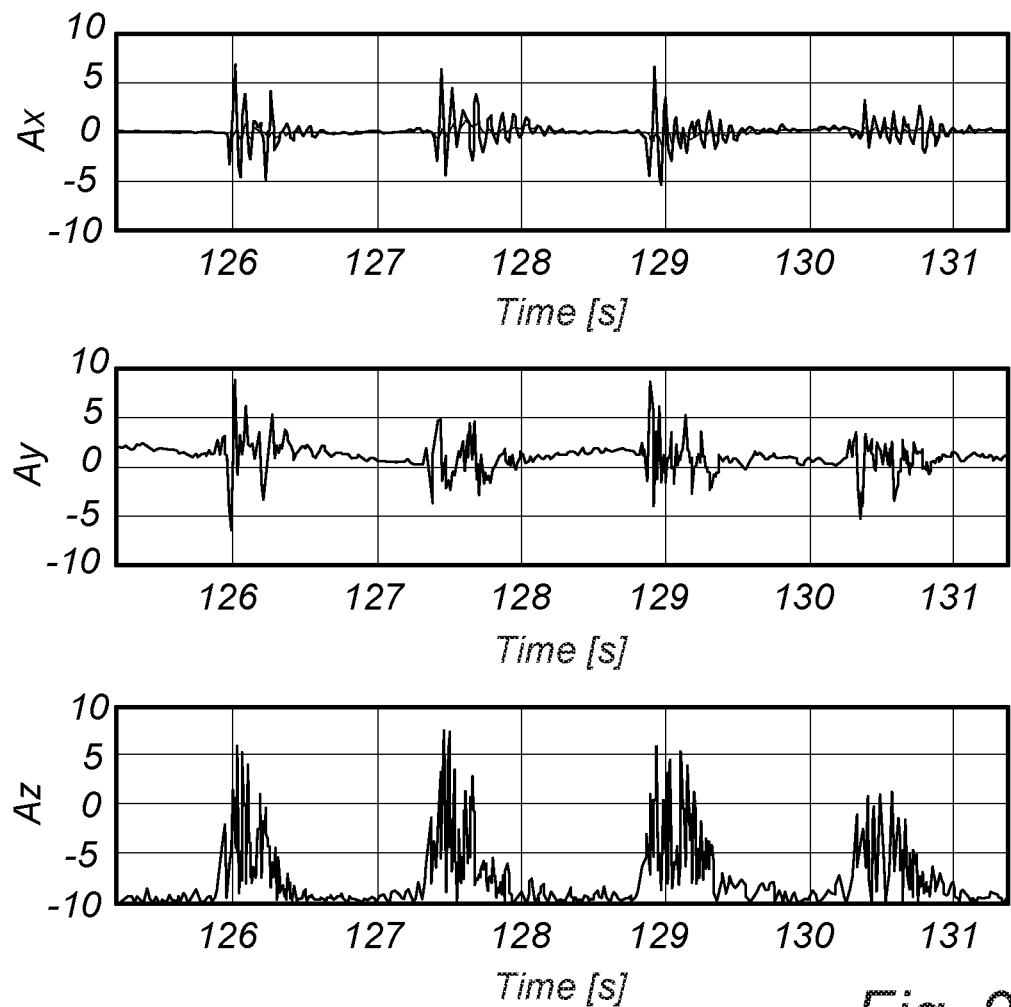
FIG. 9 schematically illustrate acceleration energies of a vehicle according to an embodiment of the disclosure.

FIG. 9 illustrates the vehicle acceleration energies from an IMU in x (Ax), y (Ay) and z, (Az) as the vehicle travels over four pot holes. Each pot hole is traversed by two wheels, where the time between consecutive pot holes is significantly larger than the time between the front and rear wheel passing the pot hole. Thereby, the response resulting from the front and rear wheels cannot be clearly distinguished since the two peaks are somewhat obscured by noise. When observing only the acceleration energy, it is difficult to determine the exact nature of the disturbance. However, by combining the detected acceleration with the detected rack force at the corresponding points in time, the sign of the rack force indicates if the disturbance is a hole or a bump. Moreover, by observing the wheel speed and/or wheel slip of all four wheels, it can be determined if the disturbance was traversed by the left or right hand wheels of the vehicle, thereby enabling a more accurate determination of the location of the disturbance. A detailed determination of the type and location of disturbances may for example be used for road maintenance or for alerting other vehicles, e.g. in a fleet of autonomous or semi-autonomous vehicles.

Figure 10:
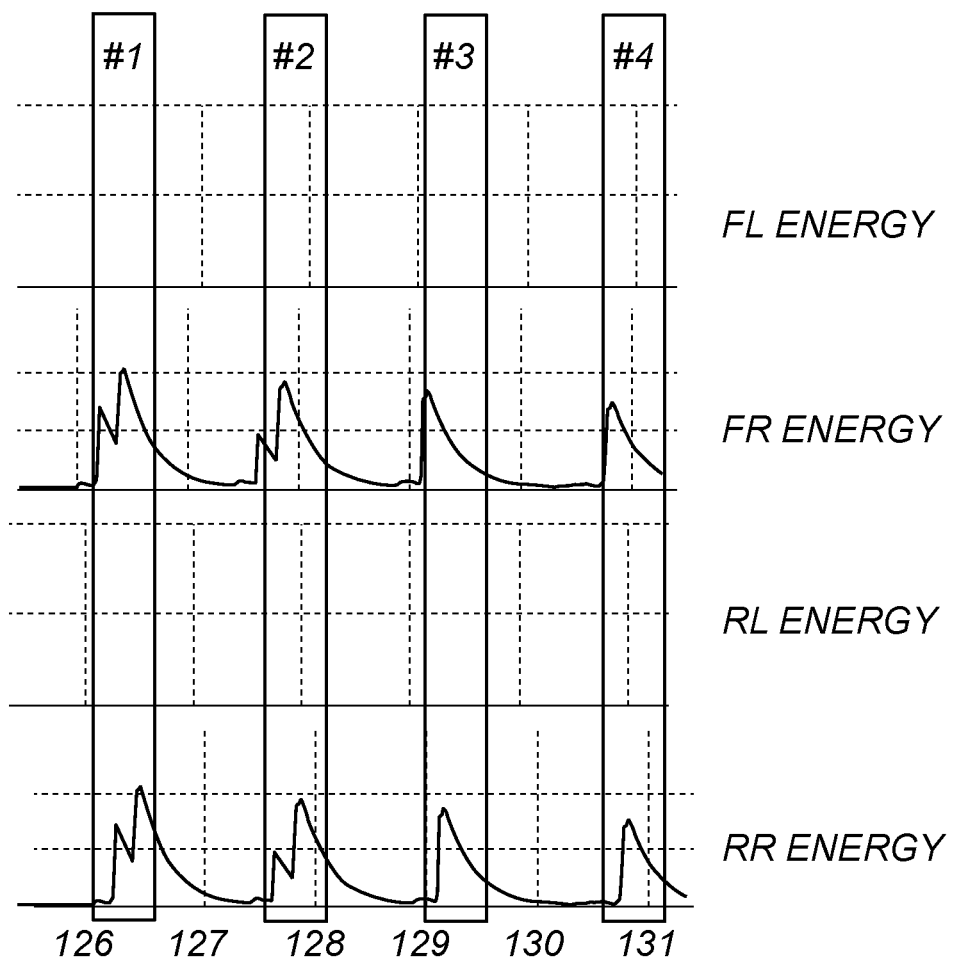
FIG. 10 schematically illustrate rack force energies of a vehicle according to an embodiment of the disclosure.

FIG. 10 schematically illustrates the wheel speed energies for all four wheels, (FL=Front Left, FR=Front Right, RL=Rear Left, RR=Rear right) when the vehicle is driving over the four disturbances described with reference to FIG. 9, i.e., four pot-holes. As can be seen in the graph, the rear wheel energies, RR and RL, are somewhat shifted in time due to vehicle movement. Here, it can be seen that only the right-hand wheels, FR and RR, of the vehicle experienced a disturbance. Accordingly, the disturbance was located at the right side of the vehicle and by further observing the detected sign of the rack force (not shown), it could be determined that the disturbance was a hole in the road. Moreover, the time delay between when the front and rear wheels experience the disturbance can be observed and correlated with the vehicle speed to be certain that it is the same disturbance experienced by both wheels.

In addition to determining the type of road surface and type of distortion, it is also desirable to provide additional information about the determined road properties, for example a confidence measure.

FIG. 11 schematically illustrates a system 400 and a method where additional outputs are provided in comparison with the system and method illustrated in FIG. 3. The system and method for determining road properties here provides the following outputs:

Road roughness indicator
Rough road detected
Road classification type
Road classification confidence
Disturbance detected
Disturbance detection confidence
Disturbance type Here, "Rough road detected" can be seen as a Boolean output telling whether a rough road is detected or not whereas the road roughness indication is an output indicating a degree of roughness, i.e., a measure of the severity of the roughness.

By providing a confidence measure of the road classification and/or the disturbance classification, it is for example possible to make a classification even if not all determined parameters match the threshold values. Moreover, the confidence measure can be used to determine an appropriate response to the detected road roughness or disturbance.

In addition to the above described uses for road classification relating to road maintenance, the detected road properties may also be used as input to different active systems of the vehicle. In the above description, the term "road" is generally used to define the surface on which the vehicle travels. However, the described system and method can obviously be used to determine properties of any type of surface on which a wheeled vehicle may travel.

Even though the disclosure has been described with reference to specific exemplifying embodiments thereof, many different alterations, modifications and the like will become apparent for those skilled in the art. Also, it should be noted that parts of the system and method for determining road properties may be omitted, interchanged or arranged in various ways, the system and method yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method in a vehicle for determining road properties, the method comprising:
   detecting vehicle acceleration in x, y and z directions;
   detecting a rack force;
   detecting a wheel speed for each of all four wheels of the vehicle;
   determining a wheel speed energy for each wheel based on the respective wheel speed of the wheel;
   determining a wheel slip for each wheel based on the respective wheel speed of the wheel;
   determining an acceleration energy in each of the x, y and z-directions based on the respective vehicle acceleration;
   determining a vehicle speed;
   determining a rack force energy based on the detected rack force; and
   determining road properties based on wheel speed energy, wheel slip, acceleration energy, vehicle speed and rack force energy.

2. The method according to claim 1 wherein determining road properties comprises determining the vehicle acceleration in x, y and z directions in an adaptive frequency band.

3. The method according to claim 1 wherein the wheel speed energy is determined as the individual wheel speed energy in an adaptive frequency band.

4. The method according to claim 1 wherein the wheel speed energy is determined as the total wheel speed energy in an adaptive frequency band.

5. The method according to claim 2 wherein the adaptive frequency band comprises at least two separate, non-overlapping, sub-bands.

6. The method according to claim 2 wherein the adaptive frequency band is selected based on a vehicle speed.

7. The method according to claim 1 wherein determining road properties further comprises comparing a wheel speed energy with a predetermined threshold value.

8. The method according to claim 1 wherein determining road properties comprises comparing an amplitude of the wheel slip with a predetermined threshold value.

9. The method according to claim 1 wherein determining road properties comprises observing the sign of the wheel slip.

10. The method according to claim 1 wherein determining road properties comprises comparing an amplitude of the rack force energy with a predetermined threshold value.

11. The method according to claim 1 further comprising determining the road properties based on a sign of the rack force.

12. The method according to claim 1 wherein the rack force is determined based on an applied torque in a power steering system.

13. The method according to claim 1 further comprising determining a road surface classification by:
   comparing the wheel speed energy with at least one threshold value
   comparing the acceleration energy with at least one threshold value;

comparing the rack force energy with at least one threshold value; and if at least one of the wheel speed energy, acceleration energy and rack force energy exceeds at least one of the threshold values, determining a road surface classification.

14. A system for determining road properties in a vehicle, the system comprising:
- a vehicle acceleration sensor configured to detect an acceleration in x, y and z directions:
- a rack force determination arrangement; and
- a wheel speed sensor for each of all four wheels of the vehicle for sensing wheel speed;
- a determination unit configured to:
- determine a wheel speed energy for each wheel based on the respective wheel speed of the wheel;
- determine a wheel slip for each wheel based on the respective wheel speed of the wheel;
- determine an acceleration energy in each of the x, y and z-directions based on the respective vehicle acceleration and vehicle speed;
- determine a rack force energy based on the detected rack force; and
- determine road properties based on wheel speed energy, rack force energy and vehicle speed.

15. The system according to claim 14 further comprising a power steering system configured to determine a force acting on a steering rack of the vehicle.

16. A system for determining road properties in a vehicle, the system comprising:
- a vehicle acceleration sensor configured to detect an acceleration in x, y and z directions:
- a rack force determination arrangement; and
- a wheel speed sensor for each of multiple wheels of the vehicle for sensing wheel speed;
- a determination unit configured to:
- determine a wheel speed energy for each wheel based on the respective wheel speed of the wheel;
- determine a wheel slip for each wheel based on the respective wheel speed of the wheel;
- determine an acceleration energy in each of the x, y and z-directions based on the respective vehicle acceleration and vehicle speed;
- determine a rack force energy based on the detected rack force; and
- determine road properties based on wheel speed energy, rack force energy and vehicle speed.

* * * * *